Figure 1:
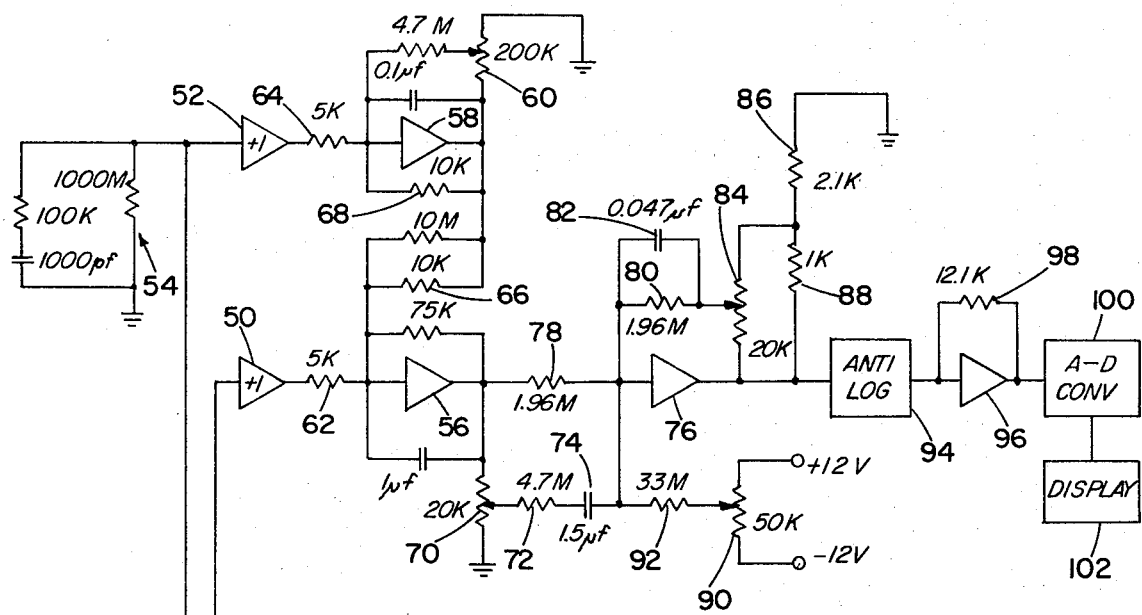
Figure 1:
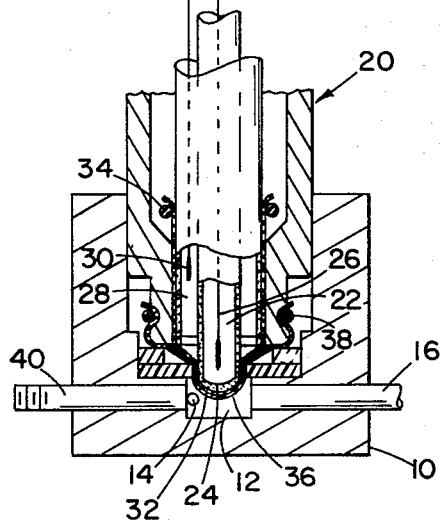

United States Patent

Blackmer

[15] 3,694,734
[45] Sept. 26, 1972

[54] SENSOR INSTRUMENTATION
[72] Inventor: David E. Blackmer, Harvard, Mass.
[73] Assignee: Instrumentation Laboratory, Inc., Lexington, Mass.
[22] Filed: April 7, 1970
[21] Appl. No.: 27,198

[52] U.S. Cl. ................. 324/29, 204/195 P, 23/254 E
[51] Int. Cl. ............................................. G01n 27/42
[58] Field of Search ....324/29, 30 R; 204/1 T, 195 B, 204/195 P; 23/230 B, 232 E, 254 E

[56] References Cited

UNITED STATES PATENTS 3,432,418  3/1969  Kleiss ..................... 204/195 P
3,528,904  9/1970  Cliffguard ............. 204/195 P

*Primary Examiner*—Michael J. Lynch
*Attorney*—Willis M. Ertman

[57] ABSTRACT

An instrument system includes a sensor that has a logarithmic response, an antilog circuit and output means connected to the output of the antilog circuit to provide, as a linear function signals representative of the constituent sensed by the sensor. Balance adjust means for inserting a first compensating function in an additive manner to the signal from the sensor is connected in circuit between the sensor and antilog circuit and slope adjust means for inserting a second compensating function to change the slope characteristic of the signal applied to the antilog circuit is connected in circuit between the balance adjust means and the antilog circuit.

12 Claims, 3 Drawing Figures

SENSOR INSTRUMENTATION

SUMMARY OF INVENTION

This invention relates to electrical instrumentation, and more particularly to electrical instrumentation for processing signals having logarithmic characteristics.

As an example, an electrochemical sensor for indicating the partial pressure of carbon dioxide in a fluid sample has a logarithmic output. In instrumentation utilizing such a sensor, it is desirable, on occasion, to provide a direct digital readout of the partial pressure of carbon dioxide in the fluid sample. A specific type of such a carbon dioxide sensor is an electrochemical sensor that is an adaption of a pH electrode and which employs a selectively permeable membrane across which the carbon dioxide constituent of the fluid sample permeates. Such an electrochemical sensor is extremely sensitive, must be calibrated accurately for accurate response and the readout should be linear, particularly useful in connection with digital readouts or displays.

It is an object of this invention to provide novel and improved instrumentation for providing a linear readout of a constituent sensed by a sensor that has a logarithmic response.

Another object of the invention is to provide a novel and improved electrochemical sensor system.

Still another object of the invention is to provide a novel and improved electrochemical sensor system that has reduced response time and which is convenient to adjust and calibrate.

A further object of the invention is to provide novel and improved electrochemical sensor instrumentation for providing a linear indication of the partial pressure of carbon dioxide in a blood sample.

In accordance with the invention there is provided an instrumentation system that employs a sensor having a logarithmic response, circuitry for producing as an output signal as an antilogarithmic function of the input signal applied to the circuit, output means connected to the output of the antilogarithmic circuit for providing, as a linear function, signals representative of the constituent sensed by that sensor, balance adjust means connected in circuit between the sensor and the antilogarithmic circuit, and slope adjustment means connected in circuit between the balance adjustment means and the antilogarithmic circuit.

In a particular embodiment the sensor is an electrochemical sensor that includes an electrode assembly and a membrane permeable to carbon dioxide gas. A differential amplifier circuit is connected to the electrode assembly and an adjustable derivative circuit is connected to the output of the differential amplifier. As the ion exchange process involved in this $pCO_2$ measurement is slow, and the electrical inputs to the measurement section are approximately exponential functions of time, the derivative circuit reduces the response time of the system by shaping the output signal from the differential amplifier. A first operational amplifier stage is also connected to the output of the differential amplifier and includes balance adjust circuitry which inserts in series a voltage to compensate for small potential differences that may be generated because of such things as curvature of the pH glass membrane of the electrode assembly. Slope adjust control is included in the feedback circuit of this operational amplifier stage to provide an adjustment of the gain of that amplifier stage. The circuitry is designed such that this first operational amplifier circuit, with a predetermined signal from the sensor, has zero output signal at an isoelectric point at which the balance adjustment may be varied independently of the slope adjust control. After the circuit has been shifted to the isoelectric point, the gain of the circuitry may be adjusted by using the slope adjust control. The output of the operational amplifier is applied to the antilog circuit which in this particular embodiment produces an output current that is an antilogarithmic function of an input voltage. A second operational amplifier stage is connected with the output of the antilogarithmic circuit for converting the output current to a voltage which is applied to an analog to digital converter and from that converter to a digital display where the partial pressure of carbon dioxide in the sample being sensed by the sensor is directly displayed in the digital form. This circuitry enables efficient, rapid measurements of the partial pressure of carbon dioxide with accuracy and in an arrangement which may be calibrated easily through two sequential adjustments, the first adjustment being independent of the second adjustment.

Figure 2:
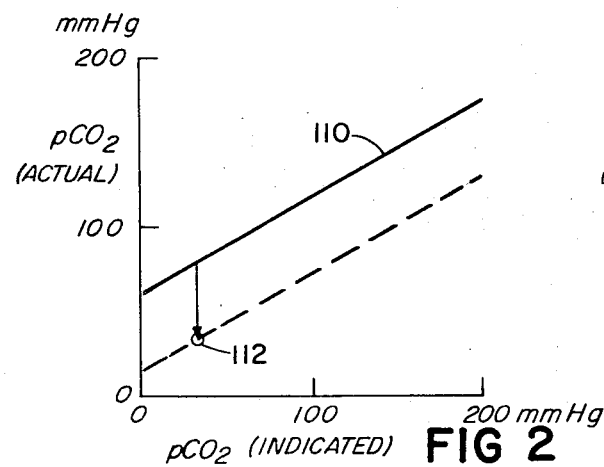
Figure 3:
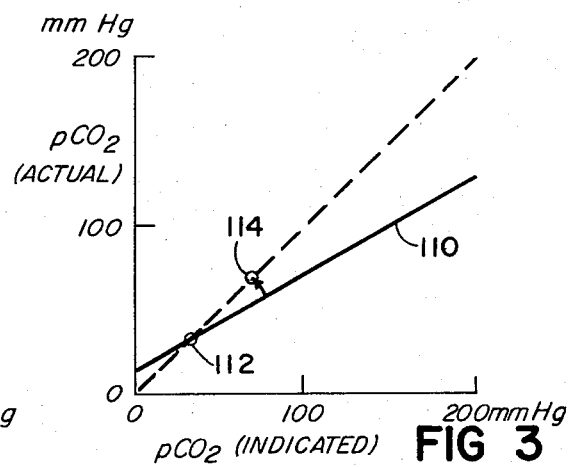

Other objects, features and advantages of the invention will be seen as the following description of a particular embodiment progresses, in conjunction with the drawing, in which:

FIG. 1 is a schematic diagram of a sensor and readout system constructed in accordance with the invention; and FIGS. 2 and 3 are graphs indicating the nature of the adjustment of the circuitry shown in FIG. 1.

DESCRIPTION OF PARTICULAR EMBODIMENT

With reference to FIG. 1, structure 10 defines a sample chamber 12 having an inlet 14 and an outlet 16. Disposed for sensing the partial pressure of carbon dioxide in a fluid sample in chamber 12 is an electrode assembly 20 which includes a pH sensitive glass membrane 22 at its tip which forms an end wall of an inner chamber 24 in which is disposed a silver/silver chloride electrode 26. An outer chamber 28 is filled with a $pCO_2$ electrolyte and contains a silver/silver chloride reference electrode 30. Disposed over the end of the electrode assembly is a nylon mesh spacer membrane 32 secured by O-ring 34 and a selectively permeable silastic membrane 36 secured by O-ring 38. Membrane 36 is permeable to carbon dioxide gas but not to ions.

Electrode 26 is connected to impedance transforming amplifier 50 and reference electrode 30 is connected to a similar impedance transforming amplifier 52. A network which includes resistor 54 establishes relationship to ground for the electrode assembly 20. Impedance transforming amplifiers 50 and 52 are in turn connected to corresponding stages of a differential amplifier that includes operational amplifiers 56 and 58, respectively. Potentiometer 60 provides a bi-lateral adjustment for common mode rejection and components 62, 64, 66 and 68 are precision (0.02 percent) resistors.

A derivative compensation circuit that includes potentiometer 70, resistor 72 and capacitor 74 is connected to the output of the differential amplifier. Potentiometer 70 provides an adjustment to vary the time constant of the derivative compensation circuit.

Also connected to the output of the differential amplifier is an operational amplifier stage that includes operational amplifier 76 with input resistor 78 and a feedback circuit that includes resistor 80, smoothing capacitor 82 and slope adjustment potentiometer 84. The potentiometer 84 is connected to the junction of voltage divider network that includes resistors 86 and 88. A balance adjustment circuit includes potentiometer 90 connected to voltage sources as indicated and resistor 92. Connected to the output of the operational amplifier stage is an antilog circuit 94 which converts an input voltage to an output current. In this particular embodiment antilog circuit 94 has the following characteristics:

| Input | Output |
| --- | --- |
| +1 volt | 700 microamperes |
| 0 volt | 70 microamperes |
| −1 volt | 7 microamperes |
| −2 volts | 0.7 microamperes |
| −3 volts | 0.07 microamperes |

The output of the antilog circuit 94 is connected to an operational amplifier stage 96 with its feedback resistor 98 being of such value that, in response to a seventy microamperes input current, an output voltage is produced that generates at display 102 a reading of 35 millimeters partial pressure. The output signal from amplifier 96 is applied to analog to digital converter 100 which in turn is connected to a display 102 which displays in digital form the sensed partial pressure of carbon dioxide in the sample in chamber 12.

In this embodiment, the electrode assembly 20 is calibrated with two gases, a "low" gas mixture of about 5 percent carbon dioxide, about 12 percent oxygen and the balance nitrogen, and a "high" gas of about 10 percent carbon dioxide, and the remainder nitrogen. When the low gas supply is flowing through the sample chamber 12, electrode assembly 20 has an output of about +5 millivolts and differential amplifier provides an output voltage of about −75 millivolts. Balance potentiometer 90 is adjusted to introduce a potential of appropriate polarity to balance that output voltage so that the input voltage to amplifier 76, and accordingly its output voltage is zero. The antilogarithmic circuit 94 has a one decade per volt response and operational amplifier stage 96 produces an output signal indicating a partial pressure of 35 millimeters Hg at display 102 in response to an input current of 70 microamperes as indicated above and thus this adjustment shifts system response line 110 vertically as indicated in FIG. 2 until it intersects isoelectric point 112 (in this embodiment 35 mm Hg). At that current output from antilog circuit 94, the input voltage is zero and in that condition the position of the tap of the slope potentiometer 84 has no effect. After the circuitry has been balanced with the low gas, the high gas is flowed through sample chamber 12 and slope potentiometer 84 is adjusted to rotate the system response line 110 about the isoelectric point 112 as indicated in FIG. 3 until the display 102 indicates the partial pressure (a typical value being 70 mm Hg) of the high gas. In this condition, system response line 110 intersects the low gas point 112 and the high gas point 114 and thus has been calibrated.

After the system has been calibrated, a blood sample is introduced into sample chamber 12 and after about 40 seconds, (this delay being reduced about forty seconds by the derivative circuit) the output is stabilized and the digital reading in millimeters of mercury displayed by display 102 indicates the partial pressure of carbon dioxide in the blood sample in chamber 12. Additional details of a blood analysis system in which this apparatus is incorporated are set out in copending application Ser. No. 27,200, now U.S. Pat. No. 3,658,478 entitled "Fluid Analyzing Apparatus" filed in the same of Spergel et al. and assigned to the same assignee as this application.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention.

What is claimed is:

1. An instrumentation system for measuring the concentration of a gas constituent in a fluid comprising sensor means responsive to said gas constituent and having a logarithmic response, circuitry for producing as an output signal as an antilogarithmic function of the input signal applied to the circuit, means for connecting said sensor to the input of said antilogarithmic circuit, output means connected to the output of said antilogarithmic circuit for providing, as a linear function, signals representative of the constituent sensed by said sensor, balance adjust means connected in circuit between said sensor and said antilogarithmic circuit for inserting a first compensating function in an additive manner to the signal from said sensor, and slope adjustment means connected in circuit between said balance adjustment means and said antilogarithmic circuit for inserting a second compensating function to change the slope characteristic of the signal applied to said antilogarithmic circuit.

2. An instrumentation system for measuring the concentration of a gas constituent in a fluid comprising a sensor having a logarithmic response, said sensor being an electrochemical sensor that includes an electrode assembly and a permeable membrane interposed between said electrode assembly and the fluid to be sensed, circuitry for producing as an output signal as an antilogarithmic function of the input signal applied to the circuit, means for connecting said sensor to the input of said antilogarithmic circuit, output means connected to the output of said antilogarithmic circuit for providing, as a linear function, signals representative of the constituent sensed by said sensor, balance adjust means connected in circuit between said sensor and said antilogarithmic circuit for inserting a first compensating function in an additive manner to the signal from said sensor, and slope adjustment means connected in circuit between said balance adjustment means and said antilogarithmic circuit for inserting a second compensating function to change the slope characteristic of the signal applied to said antilogarithmic circuit.

3. The system as claimed in claim 2 wherein said means for connecting said sensor to the input of said antilog circuit includes a differential amplifier circuit and further including an adjustable derivative circuit connected to the output of the differential amplifier.

4. The system as claimed in claim 1 and further including a first operational amplifier stage connected between said sensor and said antilogarithmic circuit and wherein said balance adjust means inserts in series a voltage between said sensor and said first operational amplifier stage.

5. The system as claimed in claim 4 wherein said slope adjustment means is included in the feedback circuit of said first operational amplifier stage.

6. The system as claimed in claim 4 wherein said output means include a second operational amplifier stage connected to the output of said antilogarithmic circuit for converting the output current of said antilogarithmic circuit to a voltage.

7. The system as claimed in claim 1 wherein said output means include an analog to digital converter responsive to the output of said antilogarithmic circuit and a digital display responsive to the output of said converter.

8. An instrumentation system for measuring the concentration of a gas constituent in a fluid comprising an electrochemical sensor responsive to said gas constituent, a first operational amplifier stage connected to the output of said sensor, balance adjust circuitry for inserting in series a compensating voltage between said sensor and said first operational amplifier stage, slope adjust control connected in the feedback circuit of said first operational amplifier stage to provide adjustment of the gain of that amplifier stage so that with a predetermined signal from said sensor said first operational amplifier stage has zero output signal at an isoelectric point at which said balance adjust circuitry may be varied independently of said slope adjust control, and an antilog circuit connected to the output of said first operational amplifier stage for providing signals representative of the constituent sensed by said sensor.

9. The system as claimed in claim 8 and further including a second operational amplifier stage connected to the output of said antilog circuit and an analog to digital converter connected to the output of said second operational amplifier stage for applying an output signal to a digital display.

10. The system as claimed in claim 8 wherein said slope adjust control includes a potentiometer and said circuitry is arranged so that zero voltage is impressed across said potentiometer at said isoelectric point.

11. An instrumentation system for measuring the concentration of a gas constituent in a fluid comprising an electrochemical sensor that includes an electrode assembly and a permeable membrane interposed between said electrode assembly and the fluid to be sensed, a first operational amplifier stage connected to the output of said sensor, balance adjust circuitry for inserting in series a compensating voltage between said sensor and said first operational amplifier stage, slope adjust control connected in the feedback circuit of said first operational amplifier stage to provide adjustment of the gain of that amplifier stage so that with a predetermined signal from said sensor said first operational amplifier state has zero output signal at an isoelectric point at which said balance adjust circuitry may be varied independently of said slope adjust control, and an antilog circuit connected to the output of said first operational amplifier stage for providing signals representative of the constituent sensed by said sensor.

12. The system as claimed in claim 11 and further including a differential amplifier circuit connected between the output of said electrode assembly and said first operational amplifier stage, and an adjustable derivative circuit connected to the output of the differential amplifier for modifying the shape of the output signal from said differential amplifier circuit, said modified output signal being applied to said first operational amplifier stage.

* * * * *